(12) United States Patent
Lee et al.

(10) Patent No.: US 10,048,506 B2
(45) Date of Patent: Aug. 14, 2018

(54) STEREOSCOPIC 3D DISPLAY DEVICE

(75) Inventors: Seung-Chul Lee, Paju Si (KR); Hoon Kang, Namyangju Si (KR); Sung-Min Jung, Namdong-gu (KR)

(73) Assignee: LG DISPLAY CO., LTD., Seoul (KR)

( * ) Notice: Subject to any disclaimer, the term of this patent is extended or adjusted under 35 U.S.C. 154(b) by 1620 days.

(21) Appl. No.: 12/340,005

(22) Filed: Dec. 19, 2008

(65) Prior Publication Data

US 2010/0007716 A1 Jan. 14, 2010

(30) Foreign Application Priority Data

Jul. 9, 2008 (KR) .................. 10-2008-0066695

(51) Int. Cl.
*H04N 13/00* (2006.01)
*G02B 27/26* (2006.01)
*H04N 13/04* (2006.01)

(52) U.S. Cl.
CPC ......... *G02B 27/26* (2013.01); *H04N 13/0434* (2013.01)

(58) Field of Classification Search
CPC ............................ G02B 27/26; H04N 13/0434
USPC .......................................................... 348/43
See application file for complete search history.

(56) References Cited

U.S. PATENT DOCUMENTS

| | | | |
|---|---|---|---|
| 6,252,570 B1 * | 6/2001 | Mangerson ..................... | 345/87 |
| 6,252,624 B1 * | 6/2001 | Yuasa et al. .................... | 348/56 |
| 6,510,002 B1 * | 1/2003 | Tsang ............................ | 359/465 |
| 2002/0118276 A1 * | 8/2002 | Seong ............................. | 348/53 |
| 2004/0012851 A1 * | 1/2004 | Sato et al. ..................... | 359/464 |
| 2005/0036082 A1 * | 2/2005 | Lai ................................. | 349/61 |
| 2005/0285997 A1 * | 12/2005 | Koyama et al. .............. | 349/117 |
| 2006/0203339 A1 * | 9/2006 | Kleinberger et al. ......... | 359/465 |
| 2006/0268196 A1 * | 11/2006 | Jung .............................. | 349/95 |

(Continued)

FOREIGN PATENT DOCUMENTS

CN  1873482 A  12/2006
EP  0 376 278  7/1990

(Continued)

OTHER PUBLICATIONS

Office Action issued in corresponding Chinese Patent Application No. 200810180777.5, mailed Feb. 11, 2011.

(Continued)

*Primary Examiner* — June Sison
*Assistant Examiner* — Steven Nguyen
(74) *Attorney, Agent, or Firm* — Brinks Gilson & Lione

(57) ABSTRACT

A stereoscopic image display device including: a main display panel operable to alternately display a left image and a right image; an auxiliary display panel including first and second substrates having a pixel part corresponding to that of the main display panel and a sub-liquid crystal layer formed between the first and second substrates, and positioned in front of the main display panel to change polarization information of an incident left or right image; a plurality of first electrodes patterned on the first substrate along the rows of pixels formed on the main display panel; a second electrode formed on a front surface of the pixel part of the second substrate; and a light source to supply light to the rear side of the main display panel. Both a 3D vertical viewing angle and 2D luminance in a glass-type 2D display can be improved.

14 Claims, 8 Drawing Sheets

(56) References Cited

U.S. PATENT DOCUMENTS

2007/0206134 A1\* 9/2007 Sung et al. .................. 349/96
2008/0284699 A1\* 11/2008 Yano et al. .................. 345/89

FOREIGN PATENT DOCUMENTS

| | | |
|---|---|---|
| JP | 61-227498 | 10/1986 |
| JP | 62-191824 | 8/1987 |
| JP | 05-232403 | 9/1993 |
| JP | 06-029914 | 2/1994 |
| JP | 06-165221 | 6/1994 |
| JP | 11-038361 | 2/1999 |
| JP | 11-298918 | 10/1999 |
| JP | 2001-214566 | 8/2001 |
| JP | 2002-296540 | 10/2002 |
| JP | 2003-189208 | 7/2003 |
| JP | 2005-181668 | 7/2005 |
| KR | 1020040062251 A | 7/2004 |
| WO | 02/569683 A1 | 8/2002 |

OTHER PUBLICATIONS

Office Action issued in corresponding Japanese Patent Application No. 2008-316168, mailed Jul. 12, 2011.
Office Action issued in corresponding Chinese Patent Application No. 200810180777.5, mailed Aug. 12, 2011.
Search Report issued in corresponding British Application 0821455.3; issued Mar. 25, 2009.
Office Action issued in corresponding Japanese Patent Application No. 2008-316168, mailed Mar. 13, 2012.
Office Action issued in corresponding Korean Patent Application No. 10-2008-0066695, mailed Nov. 29, 2012.

\* cited by examiner

| time [ms] | 1 frame | | 2 frame | | 3 frame | |
|---|---|---|---|---|---|---|
| | 0-8 | 8-16 | 16-24 | 24-32 | 32-40 | 40-48 |
| main LCD image | 🎳 | 🎳 | 🎳 | 🎳 | 🎳 | 🎳 |
| outputted polarized light | ↔ | ⊙ | ↔ | ⊙ | ↔ | ⊙ |
| auxiliary LCD is driven | ⌫ | ⊖ | ⌫ | ⊖ | ⌫ | ⊖ |
| upper polarizer | ⊙ | ⊙ | ⊙ | ⊙ | ⊙ | ⊙ |
| lower polarizer | ↔ | ↔ | ↔ | ↔ | ↔ | ↔ |

STEREOSCOPIC 3D DISPLAY DEVICE

BACKGROUND

1. Field of the Disclosure

The present invention relates to a stereoscopic 3D (Three-Dimensional) display device and, more particularly, to a stereoscopic 3D display device allowing viewing of a stereoscopic image by using polarization glasses.

2. Description of the Related Art

A 3D display may be briefly defined as 'the sum of a system artificially reproducing a 3D screen image'.

Here, the system includes a software technique for displaying an image three-dimensionally and hardware implementing contents created by the software technique as an actual 3D image. The reason of including the software region is because, for 3D display hardware, contents created by a software-wise method are separately required for each stereoscopic implementing method.

Also, a virtual 3D display is literally the sum of a system providing a virtual 3D effect with planar display hardware by using, among various factors providing stereoscopy, binocular disparity, caused by the fact that users' eyes are separated from each other by about 65 mm in a horizontal direction. In other words, when a user looks at an object, the user's eyes see slightly different images (strictly speaking, sharing left and right spatial information) of the object because of the binocular disparity, and when the two images are transferred to the brain of the user via the retina, the brain accurately combines them to allow the user to feel the 3D effect of the image. Based on this, a 2D display device simultaneously displays the two left and right images and sends them to the user's respective eyes to create virtual stereoscopy, which is the so-called virtual 3D display.

In such a virtual 3D display hardware device, in order to display images of two channels on the single screen, in most cases, the channels are outputted by changing lines, namely, one line at a time, in one of horizontal or vertical directions on the single screen. When the images of the two channels are simultaneously outputted on the single display device, due to the hardware structure, in case of an autostereoscopic scheme, the right image is transferred to the right eye and the left image is only transferred to the left eye In case of the method using (wearing) glasses, special glasses suitable to each method is used such that the left eye is covered so that it cannot see the right screen image and the right eye is covered so that it cannot see the left screen image.

Although the channels are outputted by changing lines one by one, because the thickness of the lines and the interval between lines are about 0.1 mm to 0.5 mm, too fine for the user's eyes to recognize, the user's eyes recognize the two images of the respective channels as a single screen. However, compared with the case where 2D screen is used, the amount of information reaching the user's eyes from the screen of the same size is halved per channel, so the resolution and a sensible brightness are reduced to about one half as well.

The stereoscopic image display method includes a method for wearing glasses and an autostereoscopic method in which glasses are not used.

A typical method that does not use glasses (in which the user does not wear glasses) includes a lenticular method and a parallax barrier method.

In the lenticular method, a lenticular lens plate on which cylindrical lenses are vertically arranged is installed in front of a display panel.

In the parallax barrier method, two left and right screens are alternately disposed at certain interval therebetween behind a slit-shaped opening called a parallax barrier, so that the two left and right images can be separately viewed through the opening at a particular point of time. That is, the parallax barrier method simply discriminates the left and right channels by blocking them with a wall, rather than using an optical technique such as a polarization method.

FIG. 1 is a schematic view showing the configuration of a stereoscopic image display device employing parallelax barrier method according to the related art, in which a stereoscopic image and a planar image are selectively switched.

As shown, a stereoscopic image display device 1 includes a backlight light source 40, a display panel 30, and a switching panel 20.

The switching panel 20 includes an opaque slit portion and a transparent slit portion, which have a certain width and are alternately disposed. When an electrical signal is applied to the switching panel, the opaque slit portion becomes opaque and the transparent slit portion becomes transparent.

An observer 10 looks at the display panel 30 via the transparent slit portion of the switching panel 20, and in this case, the observer's left eye (L) sees a left eye region Lp of the display panel 30 via the transparent slit portion of the switching panel 20 and the observer's right eye (R) sees a right eye region Rp of the display panel 30 via the transparent slit portion.

In this manner, the observer's left eye (L) and right eye (R) see different regions of the display panel 30, and at this time, the display panel 30 displays images corresponding to the left and right eyes on the left eye region Lp and the right eye region Rp. Accordingly, the observer can feel a three-dimensional effect according to the binocular disparity (binocular parallax).

However, because the parallax barrier method discriminates images with the structure of simply covering the visual field, not using any particular optical technique, if the observer is not at the position intended initially at the designing, the observer's eyes are not within the corresponding range and the images are seen broken. The restricted positions include left/right positions and front/rear positions.

In addition, in the 2D mode, the barrier degrades the brightness of screen image, and a certain user (observer) may feel that the barrier is unpleasant to his eyes.

BRIEF SUMMARY

A stereoscopic image display device includes a main display panel operable to alternately display a left image and a right image; an auxiliary display panel including first and second substrates having a pixel part corresponding to that of the main display panel and a sub-liquid crystal layer formed between the first and second substrates, and positioned in front of the main display panel to change polarization information of an incident left or right image; a plurality of first electrodes patterned on the first substrate along the rows of pixels formed on the main display panel; a second electrode formed on a front surface of the pixel part of the second substrate; and a light source to supply light to the rear side of the main display panel.

The foregoing and other features and aspects of the present invention will become more apparent from the following detailed description of the present invention when taken in conjunction with the accompanying drawings.

DETAILED DESCRIPTION OF THE DRAWINGS AND THE PRESENTLY PREFERRED EMBODIMENTS

Figure 1:
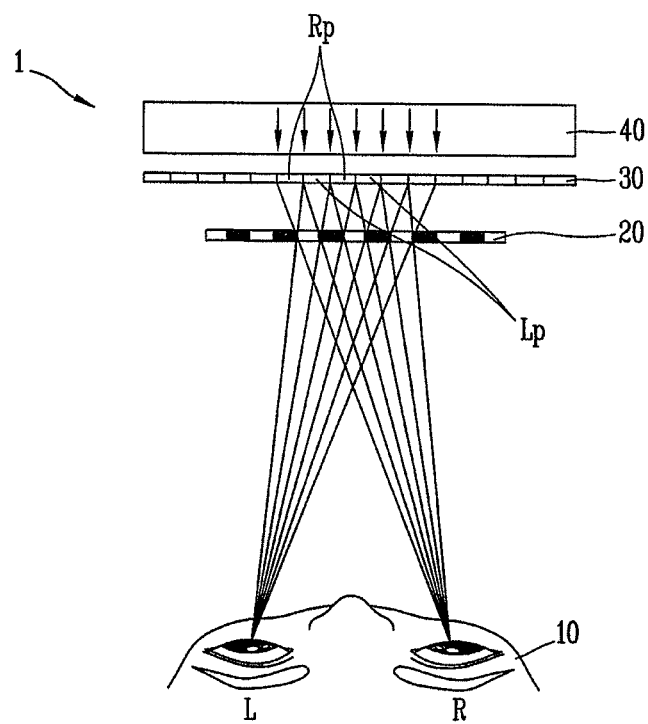
FIG. 1 is a view schematically showing the configuration of a stereoscopic image display device according to a related art parallax barrier method.

As the main stream of display devices is shifted from CRTs (Cathode Ray Tubes) to flat panel displays such as LCDs (Liquid Crystal Displays), research and the practical use of a glass type virtual 3D display scheme are shifting from the scheme optimized for the CRTs to a scheme optimized for the flat panel displays.

A polarization method is to separate images of left and right eyes by using a light blocking effect according to combination of perpendicular polarization elements. In a polarization mode display device, when two images are simultaneously outputted, right and left images are displayed on the entire screen by turns one line at a time. The two simultaneously outputted images are seen by the observer's eyes, so the images should be filtered through polarization glasses. Namely, the images are filtered such that the left image is not seen to the right eye and the right image is not seen to the left eye through the glasses.

A polarization filter used in the polarization method refers to a filter that allows light vibrating in a particular direction, among light diffused in various directions, to pass therethrough and absolve light vibrating in the other remaining directions.

The process in which the respective images are seen to the both eyes by using the polarization filter in the polarization method will be described as follows.

First, in the display device, the left and right images are allowed to pass through the polarization filter in different directions so as to turn into light vibrating in different directions. Thereafter, when the light is filtered through the polarization glasses, each side of the glasses has polarization filters of the same directions as those of the respective left and right images so as to prevent the opposite images from being seen. For example, if a left image is polarized to include only light vibrating at −45° and a right image is polarized to include only light vibrating at 45° and the left polarization glass is made to include −45° polarization filter and the right polarization glass is made to include 45° polarization filter, the left image including light vibrating at −45° would not pass through the right glass of 45°, and vice versa, resulting in that only one image suitable for each eye is recognized.

The polarization method may have a considerably wide viewing angle in horizontal or vertical direction according to the direction in which images of two channels are divided. In general, in consideration of situations where many people watch the screen, left/right images are divided in a horizontal direction to secure a left/right (horizontal) viewing angle. The polarization method can obtain nearly a 180° horizontal viewing angle, so it can be suitable for a screen where many people are watching at the same time. In this case, when the horizontal viewing angle is secured, an up/down (vertical) viewing angle is compromised, and in this case a pseudoscopic phenomenon, in which the polarization states of the left image and the right image are interchanged in the direction of the vertical viewing angle so that the left-eye image is seen to the right eye and the right-eye image is seen to the left eye, occurs.

Figure 2:
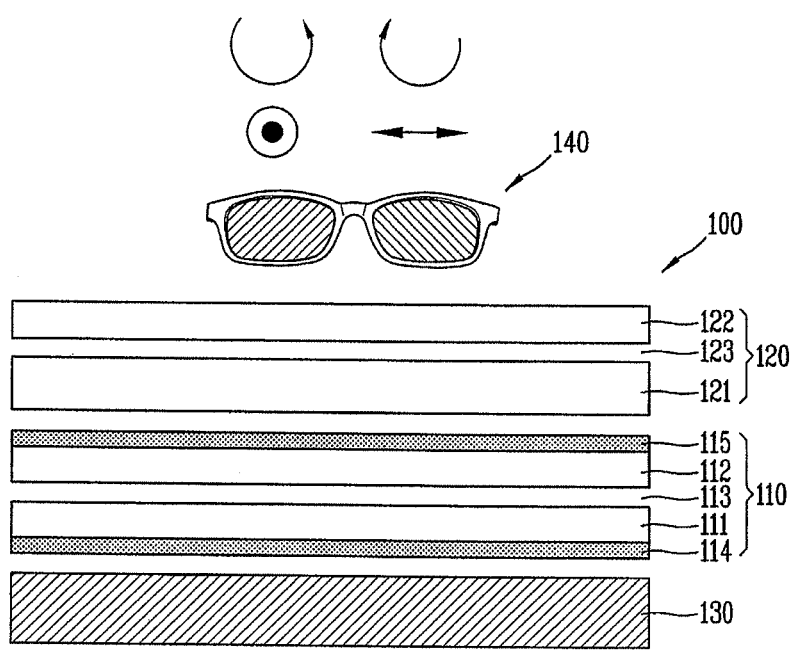
FIG. 2 is a sectional view showing the structure of a stereoscopic image display device according to a first embodiment of the present invention.

FIG. 2 is a sectional view schematically showing the structure of a stereoscopic image display device according to a first embodiment of the present invention.

As shown, the stereoscopic image display device 100 according to the first embodiment of the present invention includes a main display panel 110 that displays a left image and a right image in turns, an auxiliary display panel 120 positioned in front of the main display panel 110, a light source 130 that supplies light to the rear side of the main display panel 110, and polarization glasses 140 that selectively transmit a left or right image outputted from the auxiliary display panel 120 according to a polarization state to implement a stereoscopic image.

The main display panel 110 displays a left image to be made incident to the left eye of a viewer (user) and a right image to be made incident to the right eye of the viewer in turns in order to implement a stereoscopic image.

The main display panel 110 according to the first embodiment of the present invention may be a liquid crystal panel. If a liquid crystal panel according to the related art is driven at 60 Hz, the main display panel 110 is preferably driven at 120 Hz. This aims to display the left and right images in turns while securing a stereoscopic picture quality of above a certain level.

The main display panel 110 has the same structure as the liquid crystal panel according to the related art, except for a driving principle to be hereinafter described.

Where the main display panel 110 is a liquid crystal panel, the main display panel 110 includes a thin film transistor (TFT) array substrate 111, a color filter substrate 112 disposed facing the array substrate 111, a main liquid crystal layer 113 positioned between the array substrate 111 and the color filter substrate 112, first and second polarizers 114 and 115 attached on outer surfaces of the array substrate 111 and the color filter substrate 112. Here, the first and second polarizers 114 and 115 are disposed such that their polarization axes are substantially perpendicular to each other.

Meanwhile, in addition to a liquid crystal panel, the main display may be a flat display panel such as a plasma display panel (PDP), an organic light emitting diode (OLED), or the like.

As described above, the auxiliary display panel 120 according to the first embodiment of the present invention is positioned in front of the main display panel 110. The auxiliary display panel 120 is driven in synchronization with one of left and right images of the main display panel 110 and serves to change polarization information of incident left or right image. In this case, the auxiliary display panel includes a first substrate 121 and a second substrate 122 that face each other, and a sub-liquid crystal layer 123 positioned between the first and second substrates 121 and 122.

First and second electrodes (not shown) and an alignment film (not shown) for controlling an arrangement of the sub-liquid crystal layer 123 are provided on the first and second substrates 121 and 122.

Figure 3A:
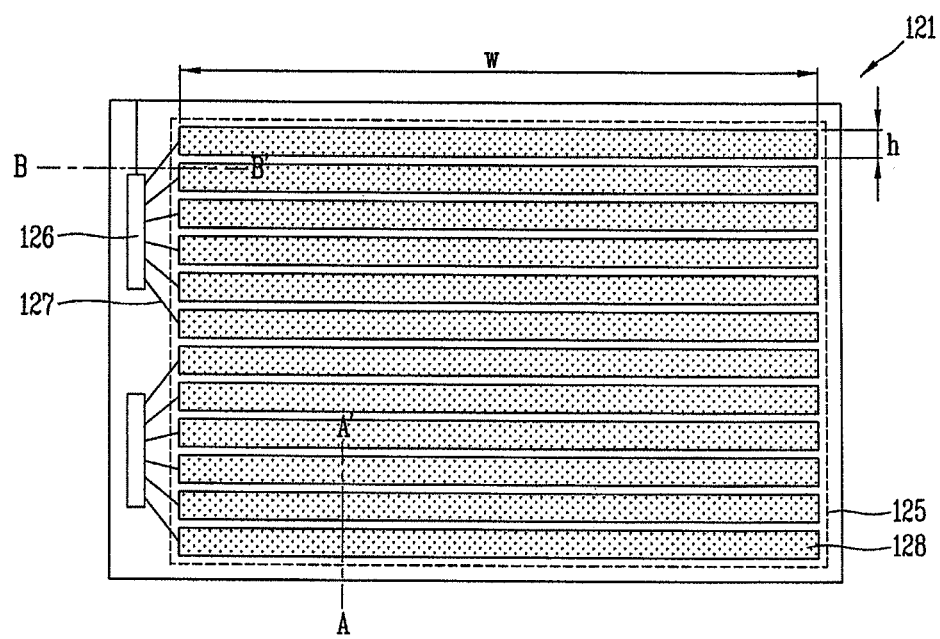
FIGS. 3A and 3B are plan views schematically showing the structure of lower and upper substrates of an auxiliary display panel of the stereoscopic image display device.
Figure 3B:
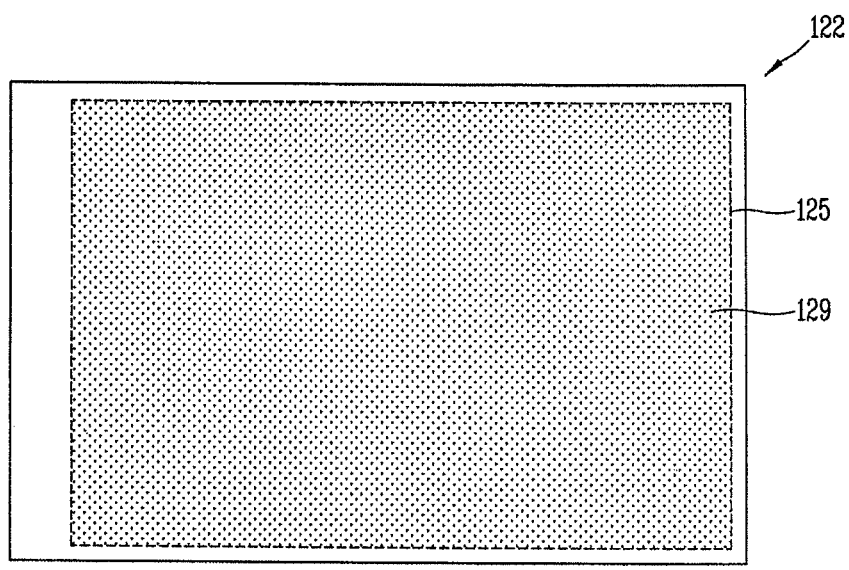
Figure 4A:
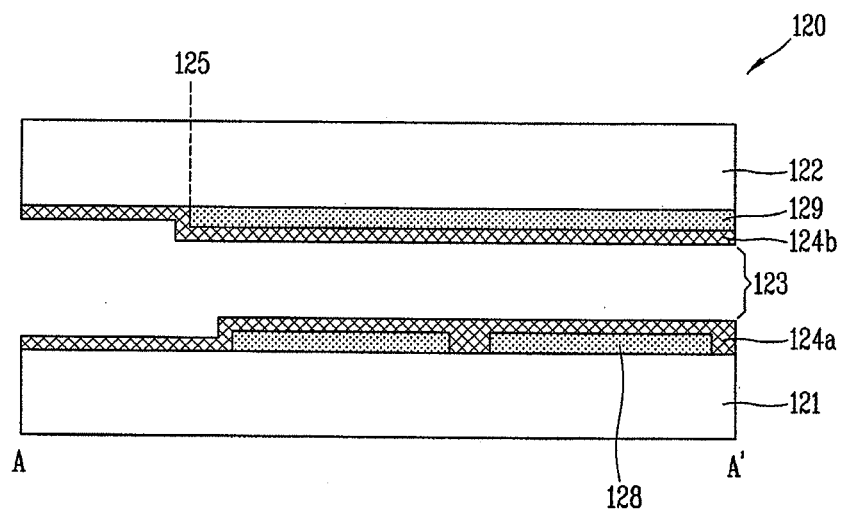
FIGS. 4A and 4B are sectional views taken along lines A-A' and B-B' of the upper substrate of the auxiliary display panel in FIG. 3A.
Figure 4B:
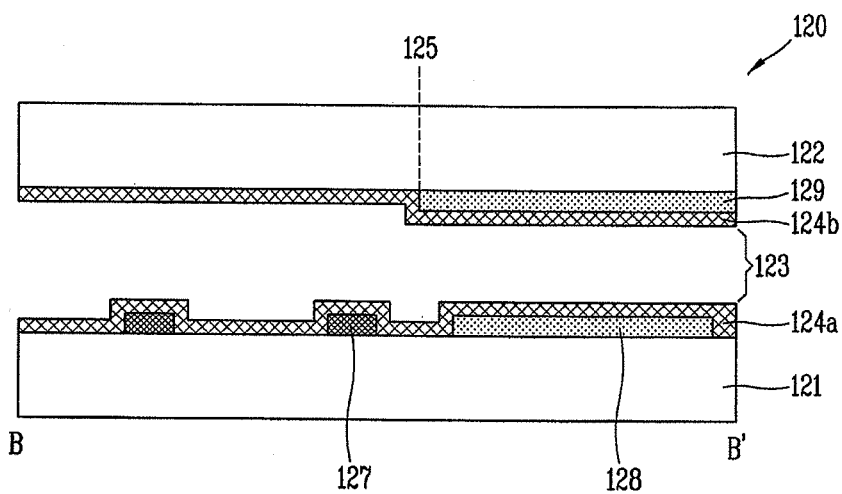

FIGS. 3A and 3B are plan views schematically showing the structure of lower and upper substrates of the auxiliary display panel of the stereoscopic image display device. FIGS. 4A and 4B are sectional views taken along lines A-A' and B-B' of the upper substrate of the auxiliary display panel in FIG. 3A.

First, as shown in FIG. 3A (see, FIGS. 4A and 4B), first electrodes 128 made of a transparent conductive material such as indium tin oxide (ITO) are patterned along lines (rows) of pixels of the main display panel on the first substrate 121, the lower substrate of the auxiliary display panel 120.

The height (h) of the first electrode 128 corresponds to the height of a single pixel of the main display panel, and the width (w) of the first electrode 128 corresponds to 'n' (n=1, 2, . . . ) times the width of a pixel part 125.

Reference numerals 126 and 127 denote a driver IC (Integrated Circuit) for applying signals and signal wirings for connecting the driver IC and the first electrodes 128. The signal wirings 127 are made of a conductive material such as copper or molybdenum.

As shown in FIG. 3B (see, FIGS. 4A and 4B), a second electrode 128 made of the same material as the first electrode 128 is wholly formed, without any patterns, on the entire surface of the pixel part 125 of the second substrate 122, the upper substrate of the auxiliary display panel 120.

Alignment films 124a and 124b for aligning the sub-liquid crystal layer 123 are positioned on the facing surfaces of the first and second substrates 121 and 122, respectively.

The auxiliary display panel 120 may include different types of sub-liquid crystal layers 123.

Figure 5:
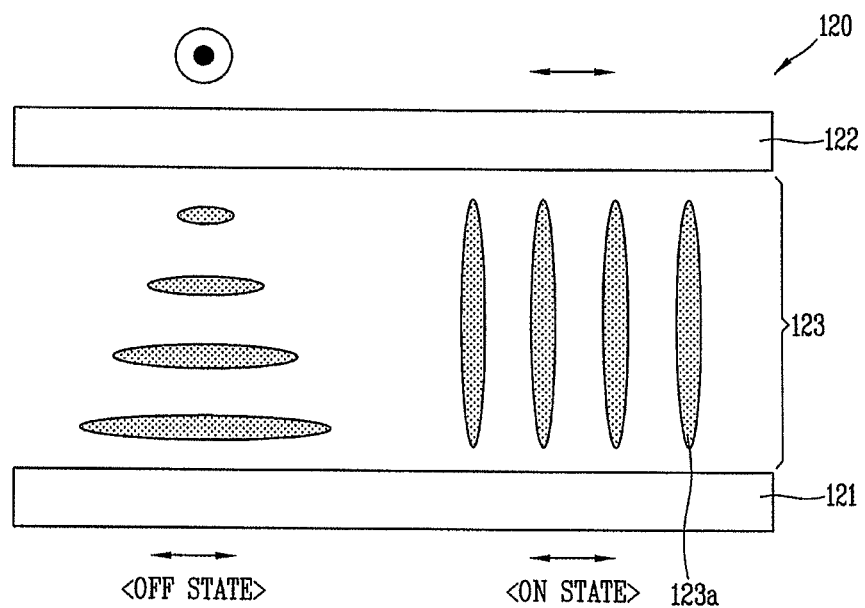
FIG. 5 is a view for explaining operational characteristics of an auxiliary display panel having a sub-liquid crystal layer of a TN mode.

FIG. 5 is a view for explaining operational characteristics of the auxiliary display panel having a sub-liquid crystal layer of a TN mode.

As illustrated, when the auxiliary display panel 120 is turned off, a plurality of liquid crystal molecules 123a constituting the sub-liquid crystal layer 123 are twisted at 90° (TN structure) or 240° (STN structure) and arranged between the first and second substrates 121 and 122 along a rubbing direction of the alignment films (not shown) of the first and second substrates 121 and 122. When the auxiliary display panel 120 is turned on, the liquid crystal molecules 123a are vertically arranged between the first and second substrates 121 and 122 due to an electric field formed between the first and second substrates 121 and 122.

Accordingly, if the auxiliary display panel 120 is in an OFF state, when the left or right image passes the auxiliary display panel 120, their polarization axis is rotated by 90°. Namely, if the auxiliary display panel 120 is not driven, the polarization axis of the left or right image which has passed through the auxiliary display panel 120 is changed to be substantially perpendicular to the polarization axis of the left or right image made incident to the auxiliary display panel 120.

The reason of the change in the polarization axis of the left or right image is because of a refractive index anisotropy ($\Delta n$) of the sub-liquid crystal layer 123. The longer axis and the shorter axis of the liquid crystal molecules 123a have different refractive indexes, which is called a refractive index anisotropy ($\Delta n$). The refractive index anisotropy ($\Delta n$) is defined by a value obtained by subtracting a refractive index of the shorter axis direction from that of the longer axis direction. As shown, the liquid crystal molecules 123a are arranged after being twisted by 90° or 240°, and incident light proceeds according to the refractive index anisotropy ($\Delta n$) of the sub-liquid crystal layer 123, changing the polarization state or polarization information of the incident light as described above.

When the auxiliary display panel 120 is in an ON state, the polarization axis of the left or right image that has passed through the auxiliary display panel 120 does not change. This is because as the liquid crystal molecules are arranged to be perpendicular to the first and second substrates 121 and 122, light passes through the sub-liquid crystal layer 123 only with the refractive index in the shorter axis direction, not the refractive index anisotropy ($\Delta n$). Therefore, the polarization state or polarization information is not changed.

Figure 6:
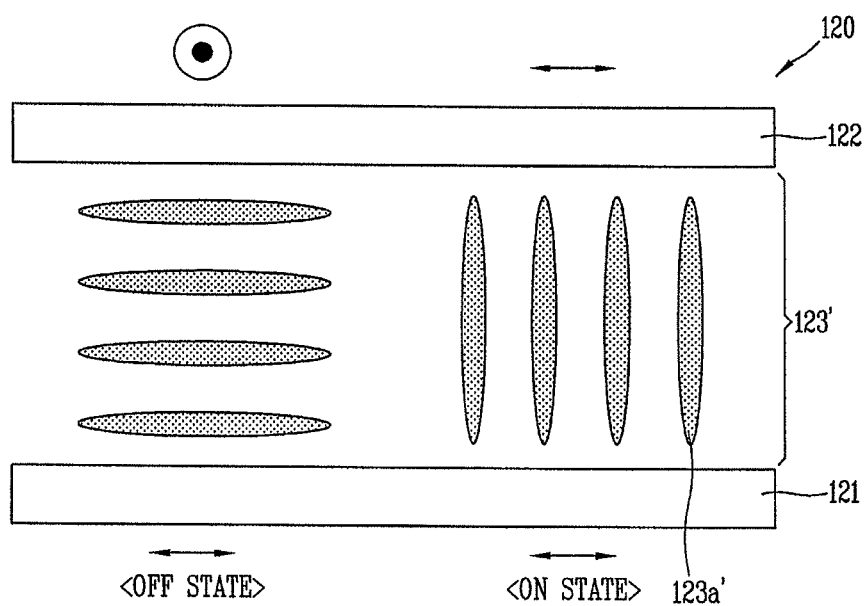
FIG. 6 is a view for explaining operational characteristics of an auxiliary display panel having a homogenous sub-liquid crystal layer.
Figure 7:
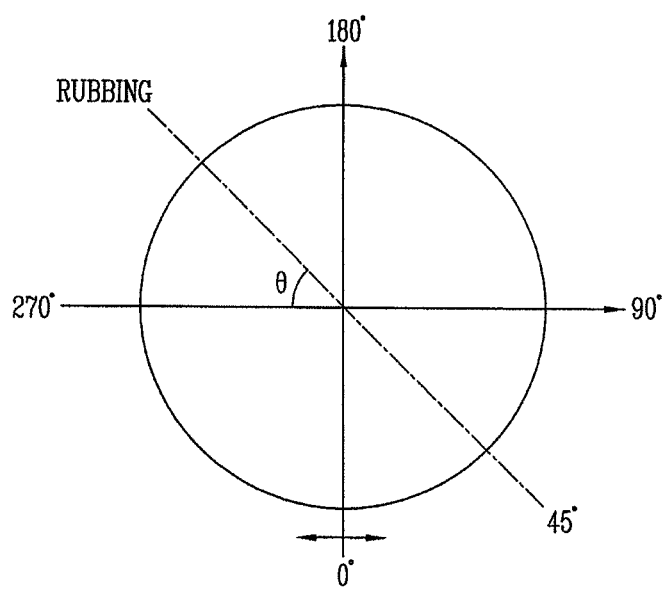
FIG. 7 is a view showing a rubbing direction of the auxiliary display panel having the homogenous sub-liquid crystal layer.

FIG. 6 is a view for explaining operational characteristics of an auxiliary display panel having a homogenous sub-liquid crystal layer. FIG. 7 is a view showing a rubbing direction of the auxiliary display panel having the homogenous sub-liquid crystal layer.

As illustrated, if the auxiliary display panel 120 includes a homogenous sub-liquid crystal layer 123', when the auxiliary display panel 120 is turned off, the liquid crystal molecules 123a' are arranged to be substantially parallel to the first and second substrates 121 and 122. A rubbing direction of the auxiliary display panel 120 is substantially at 45° with respect to the polarization axis of the left or right image made incident to the auxiliary display panel 120.

Thus, if the auxiliary display panel 120 is not driven, the liquid crystal molecules 123a' are arranged to be parallel to the first and second substrates 121 and 122 in a direction inclined at 45° from the polarization axis of the incident left or right image. When the auxiliary display panel 120 is turned on, the liquid crystal molecules 123a' are arranged to be substantially perpendicular to the first and second substrates 121 and 122.

In this case, where the sub-liquid crystal layer 123' has a homogenous arrangement, the sub-liquid crystal layer 123' may preferably satisfy an equation $\Delta n \times d = \lambda/2$. Here, 'd' is a cell gap of the sub-liquid crystal layer 123', $\Delta n$ indicates a refractive index anisotropy of the sub-liquid crystal layer 123', and $\lambda$ indicates wavelength of light that has passed through the sub-liquid crystal layer 123'.

The reason for the sub-liquid crystal layer 123' preferably satisfying the equation $\Delta n \times d = \lambda/2$ is to change the phase of incident left or right image by 180°. Accordingly, as shown in FIG. 6, when the auxiliary display panel 120 is in an OFF state, the left or right image that passes through the auxiliary display panel 120 has a polarization axis substantially perpendicular to that of the left or right image made incident on the auxiliary display panel 120, and is outputted to outside the auxiliary display panel 120.

Meanwhile, when the auxiliary display panel 120 is in an ON state, the polarization axis of the left or right image that has passed through the auxiliary display panel 120 is not changed. This is because as the liquid crystal molecules 123a' are arranged to be perpendicular to the first and second substrates 121 and 122, light passes through the sub-liquid crystal layer 123' only with the refractive index in the shorter axis direction, not the refractive index anisotropy (Δn). Therefore, the polarization state or polarization information is not changed.

As described above, in the first embodiment of the present invention, the first and second electrodes are formed on the first and second substrates of the auxiliary display panel such that they correspond to the rows of the pixels and the pixel part of the main display panel, and driving is performed at 120 Hz to apply signals to the corresponding first and second electrodes of the auxiliary display panel according to a signal addressing of the main display panel to change the polarization state according to left or right image displayed on each subframe, thereby improving both the 3D vertical viewing angle and the 2D luminance.

Figure 8:
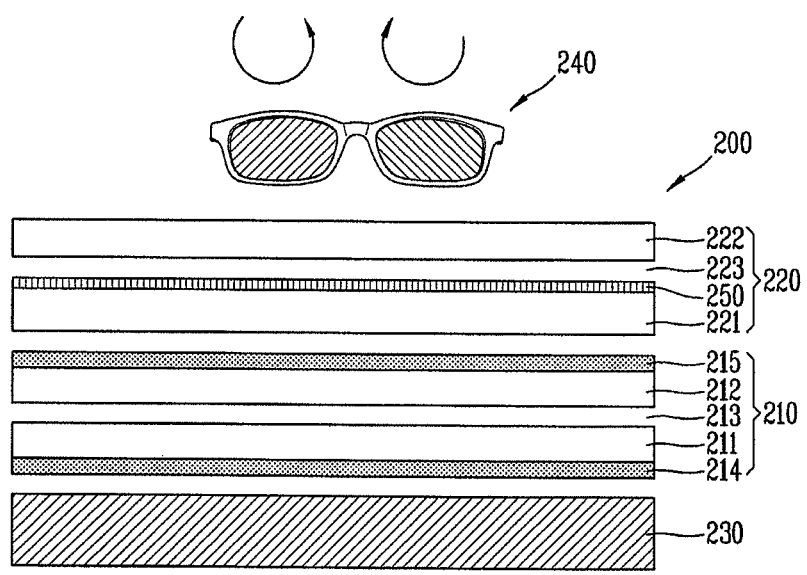
FIG. 8 is a sectional view schematically showing the structure of a stereoscopic image display device according to a second embodiment of the present invention.

FIG. 8 is a sectional view schematically showing the structure of a stereoscopic image display device according to a second embodiment of the present invention, in which the structure is substantially the same as that of the stereoscopic image display device according to the first embodiment of the present invention except that a λ/4 retardation layer is inserted to the lower substrate of the auxiliary display panel.

As illustrated, the stereoscopic image display device 200 according to the second embodiment of the present invention includes a main display panel 210 that displays a left image and a right image in turns, an auxiliary display panel 220 positioned in front of the main display panel 210, a light source 230 that supplies light to the rear side of the main display panel 210, and polarization glasses 240 that selectively transmit a left or right image outputted from the auxiliary display panel 220 according to a polarization state to implement a stereoscopic image.

The light source 230 is positioned at a rear side of the main display panel 210 and emits light to the main display panel 210. Here, the light source 230 may be a direct type light source or an edge type light source. As the light source 230, a cold cathode fluorescent lamp (CCFL) may be used, and an external electrode fluorescent lamp (EEFL) that has characteristics of high luminance, low cost and low power consumption and that can drive a light source by using a single inverter may be also used. And a light emitting diode (LED) having good luminance and color reproduction can be also used as a light source.

The polarization glasses 240 are to view a stereoscopic image by dividing left and right images according to a polarization state of the left or right image outputted from the auxiliary display panel 220. The polarization glasses 240 include a left polarization lens and a right polarization lens, and a polarization axis of the left polarization lens is substantially perpendicular to that of the right polarization lens. The polarization axis of the left polarization lens is the same as the polarization axis of one of the left and right images outputted from the auxiliary display panel 220, and the polarization axis of the right polarization lens is the same as the polarization axis of another of the left and right images outputted from the auxiliary display panel 220. Accordingly, the left and right images outputted from the auxiliary display panel 220 are discriminated according to the polarization state of the left and right images by the polarization glasses 240 and made incident to the viewer's (user's) left and right eyes, and thus the user can view a stereoscopic image.

In order to implement the stereoscopic image, the main display panel 210 alternately displays the left image to be made incident to the user's left eye and the right image to be made incident to the user's right eye.

The main display panel 210 according to the second embodiment of the present invention may be the same liquid crystal panel as that of the first embodiment of the present invention, and when the liquid crystal panel according to related art is driven at 60 Hz, the main display panel 210 may be driven at 120 Hz.

The main display panel 210 includes a thin film transistor (TFT) array substrate 211, a color filter substrate 212 disposed to face the array substrate 211, a main liquid crystal layer 213 positioned between the array substrate 211 and the color filter substrate 212, first and second polarizers 214 and 215 attached on outer surfaces of the array substrate 211 and the color filter substrate 212. Here, the first and second polarizers 214 and 215 are disposed such that their polarization axes are substantially perpendicular to each other.

As described above, the auxiliary display panel 220 according to the second embodiment of the present invention is positioned in front of the main display panel 210. The auxiliary display panel 220 is driven in synchronization with one of left and right images of the main display panel 210 and serves to change polarization information of incident left or right image. In this case, the auxiliary display panel includes a first substrate 221 and a second substrate 222 that face each other, and a sub-liquid crystal layer 223 positioned between the first and second substrates 221 and 222.

First and second electrodes (not shown) and an alignment film (not shown) for controlling an arrangement of the sub-liquid crystal layer 223 are provided on the first and second substrates 221 and 222.

The first electrodes made of a transparent conductive material such as indium tin oxide (ITO) are patterned along lines (rows) of pixels of the main display panel on the first substrate 221, the lower substrate of the auxiliary display panel 220. The height of the first electrode corresponds to the height of a single pixel of the main display panel, and the width of the first electrode corresponds to 'n' (n=1, 2, ... ) times the width of a pixel part.

The second electrode made of the same material as the first electrode is wholly formed, without any patterns, on the entire surface of the pixel part of the second substrate 222, the upper substrate of the auxiliary display panel 220.

Alignment films for aligning the sub-liquid crystal layer 223 are positioned on the facing surfaces of the first and second substrates 221 and 222, respectively.

The stereoscopic image display device according to the second embodiment of the present invention includes a λ/4 retardation layer 250 formed on an upper surface of the first substrate 221 of the auxiliary display panel 220 to change a linear polarization made incident from the main display panel 210 to a circular polarization.

The λ/4 retardation layer 250 according to the second embodiment of the present invention is formed in an in-cell form together with the first substrate 221.

Figure 9:
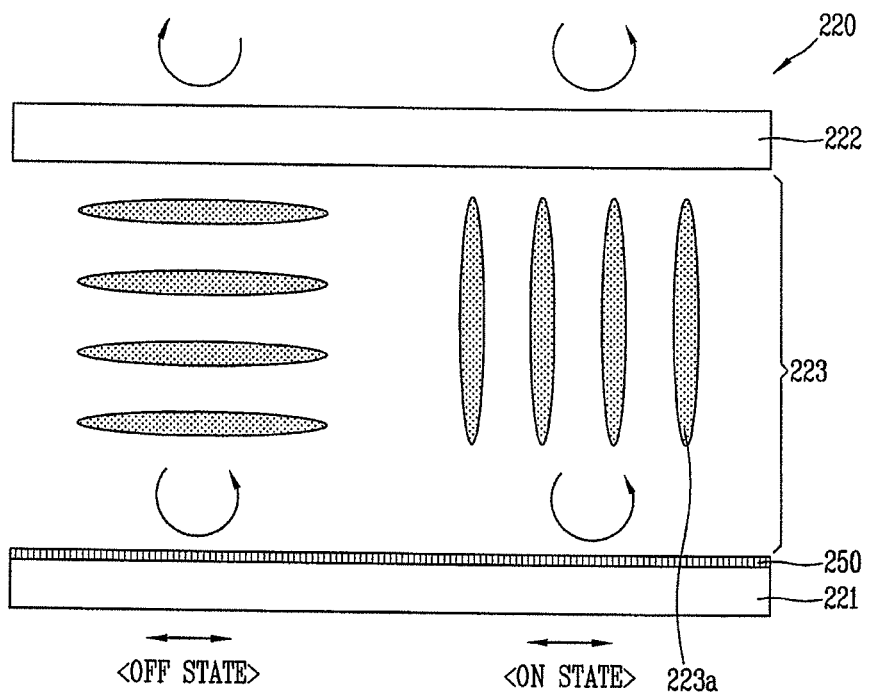
FIG. 9 is a view for explaining operational characteristics of an auxiliary display panel of the stereoscopic image display device in FIG. 8.

FIG. 9 is a view for explaining operational characteristics of the auxiliary display panel of the stereoscopic image display device in FIG. 8, in which the auxiliary display panel has a homogenous sub-liquid crystal layer.

As illustrated, when the auxiliary display panel 220 has the homogenous sub-liquid crystal layer 223, if the auxiliary display panel 220 is turned off, liquid crystal molecules 223a are arranged to be substantially parallel to the first and second substrates 221 and 222. A rubbing direction of the auxiliary display panel 220 and an optical axis of the λ/4 retardation layer 250 are substantially at 45° with respect to the polarization axis of the left or right image made incident to the auxiliary display panel 220.

Accordingly, if the auxiliary display panel 220 is not driven, the liquid crystal molecules 223a are arranged to be parallel to the first and second substrates 221 and 222 in a 45°-inclined direction with respect to the polarization axis of the incident left or right image. When the auxiliary display panel 220 is turned on, the liquid crystal molecules 223a are arranged to be substantially perpendicular to the first and second substrates 221 and 222.

In this case, as described above, because the sub-liquid crystal layer 223 has the homogenous arrangement, the sub-liquid crystal layer 223 may satisfy an equation $\Delta n \times d = \lambda/2$.

Thus, as shown, if the auxiliary display panel 220 is in an OFF state, the linearly polarized left or right image made incident to the auxiliary display panel 220 passes through the first substrate 221 of the auxiliary display panel 220 so as to be changed in its state to a left circular polarization (or right circular polarization), which then passes through the sub-liquid crystal layer 223. At this time, a left circularly polarized (or right circularly polarized) left or right image made incident to the sub-liquid crystal layer 223 passes through the sub-liquid crystal layer 223 so as to be changed in its state to a right circular polarization (or left circular polarization), which is then outputted to outside of the auxiliary display panel 220.

If the auxiliary display panel 220 is in an ON state, the left circularly polarized (or right circularly polarized) left or right image which has passed through the auxiliary display panel 220 is outputted to the outside of the auxiliary display panel 220, with its polarization state unchanged. This is because as the liquid crystal molecules 223A are arranged to be perpendicular to the first and second substrates 221 and 222, light passes through the sub-liquid crystal layer 223 only with the refractive index in the shorter axis direction, not the refractive index anisotropy (Δn). Therefore, the polarization state or polarization information is not changed.

Figure 10:
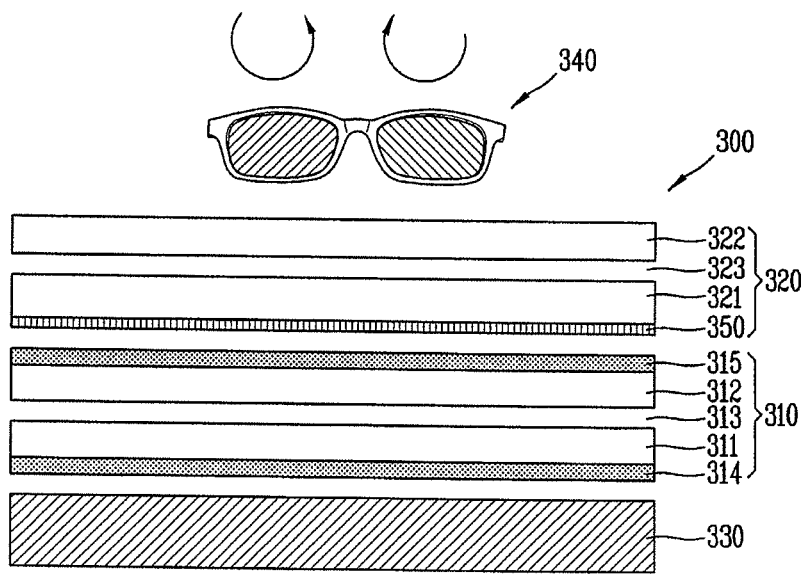
FIG. 10 is a sectional view schematically showing the structure of a stereoscopic image display device according to a third embodiment of the present invention.

FIG. 10 is a sectional view schematically showing the structure of a stereoscopic image display device according to a third embodiment of the present invention, in which the structure is substantially the same as that of the stereoscopic image display device according to the second embodiment of the present invention except that λ/4 retardation layer is attached to a rear surface of the lower substrate of the auxiliary display panel.

As illustrated, the stereoscopic image display device 300 according to the third embodiment of the present invention includes a main display panel 310 that displays a left image and a right image in turns, an auxiliary display panel 320 positioned in front of the main display panel 310, a light source 330 that supplies light to the rear side of the main display panel 310, and polarization glasses 340 that selectively transmit a left or right image outputted from the auxiliary display panel 320 according to a polarization state to implement a stereoscopic image.

The light source 330 is positioned at a rear side of the main display panel 310 and emits light to the main display panel 310. The polarization glasses 340 include left and right polarization lenses, and a polarization axis of the left polarization lens is substantially perpendicular to that of the right polarization lens. The polarization axis of the left polarization lens is the same as the polarization axis of one of the left and right images outputted from the auxiliary display panel 320, and the polarization axis of the right polarization lens is the same as the polarization axis of another of the left and right images outputted from the auxiliary display panel 320. Accordingly, the left and right images outputted from the auxiliary display panel 320 are discriminated according to the polarization state of the left and right images by the polarization glasses 340 and made incident to the viewer's (user's) left and right eyes, whereby the user can view a stereoscopic image.

In order to implement the stereoscopic image, the main display panel 310 alternately displays the left image to be made incident to the user's left eye and the right image to be made incident to the user's right eye.

The main display panel 310 according to the third embodiment of the present invention may be the same liquid crystal panel as those in the first and second embodiments of the present invention, and where the liquid crystal panel according to related art is driven at 60 Hz, the main display panel 210 may be driven at 120 Hz.

The main display panel 310 includes a thin film transistor (TFT) array substrate 311, a color filter substrate 312 disposed to face the array substrate 311, a main liquid crystal layer 313 positioned between the array substrate 311 and the color filter substrate 312, first and second polarizers 314 and 315 attached on outer surfaces of the array substrate 311 and the color filter substrate 312. Here, the first and second polarizers 314 and 315 are disposed such that their polarization axes are substantially perpendicular to each other.

As described above, the auxiliary display panel 320 according to the third embodiment of the present invention is positioned in front of the main display panel 310. The auxiliary display panel 320 is driven in synchronization with one of left and right images of the main display panel 310 and serves to change polarization information of incident left or right image. In this case, the auxiliary display panel includes a first substrate 321 and a second substrate 322 that face each other, and a sub-liquid crystal layer 323 positioned between the first and second substrates 321 and 322.

First and second electrodes (not shown) and an alignment film (not shown) for controlling an arrangement of the sub-liquid crystal layer 323 are provided on the first and second substrates 321 and 322.

The first electrodes made of a transparent conductive material such as indium tin oxide (ITO) are patterned along lines (rows) of pixels of the main display panel on the first substrate 321, the lower substrate of the auxiliary display panel 320. The height of the first electrode corresponds to the height of a single pixel of the main display panel, and the width of the first electrode corresponds to 'n' (n=1, 2, ... ) times the width of a pixel part.

The second electrode made of the same material as the first electrode is wholly formed without a pattern on the entire surface of the pixel part of the second substrate 322, the upper substrate of the auxiliary display panel 320.

Alignment films for aligning the sub-liquid crystal layer 323 are positioned on the facing surfaces of the first and second substrates 321 and 322, respectively.

The stereoscopic image display device according to the third embodiment of the present invention includes a λ/4 retardation layer 350 formed on a lower surface, namely, a rear surface, of the first substrate 321 of the auxiliary display panel 320 to change a linear polarization made incident from the main display panel 310 to a circular polarization. In addition, the λ/4 retardation layer 350 according to the third embodiment of the present invention may be attached in the form of a film on the rear surface of the first substrate 321.

Figures 11, 12:
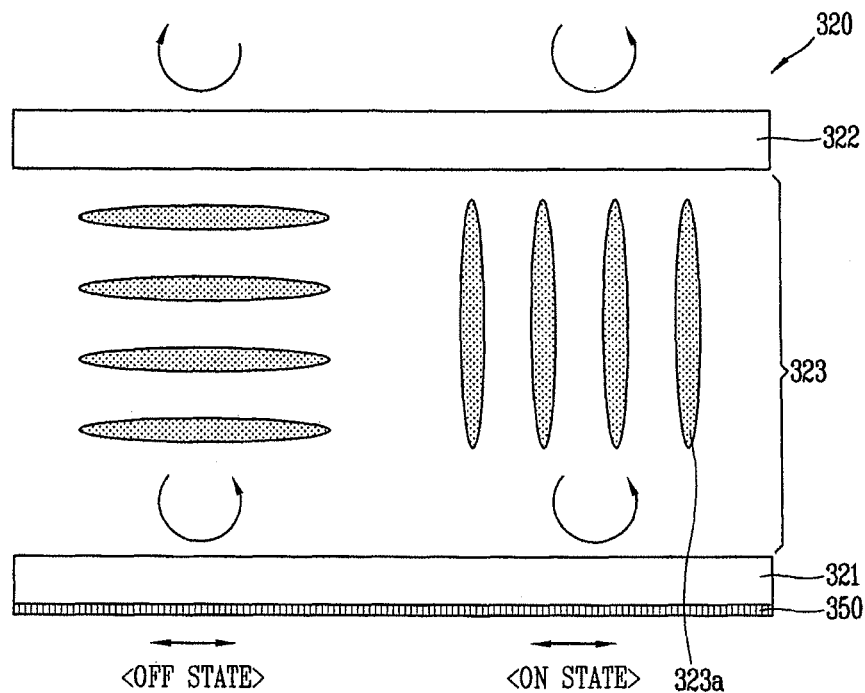
FIG. 11 is a view for explaining operational characteristics of an auxiliary display panel of the stereoscopic image display device in FIG. 10.
FIG. 12 is an exemplary view for explaining a driving principle of the stereoscopic image display device according to the present invention.

FIG. 11 is a view for explaining operational characteristics of the auxiliary display panel of the stereoscopic image display device in FIG. 10, in which the auxiliary display panel has a homogenous sub-liquid crystal layer.

As illustrated, when the auxiliary display panel 320 has the homogenous sub-liquid crystal layer 323, if the auxiliary display panel 320 is turned off, liquid crystal molecules 323a are arranged to be substantially parallel to the first and second substrates 321 and 322. A rubbing direction of the auxiliary display panel 320 and an optical axis of the λ/4 retardation layer 350 are substantially at 45° with respect to the polarization axis of the left or right image made incident to the auxiliary display panel 320.

Accordingly, if the auxiliary display panel 320 is not driven, the liquid crystal molecules 323a are arranged to be parallel to the first and second substrates 321 and 322 in a 45°-inclined direction with respect to the polarization axis of the incident left or right image. When the auxiliary display panel 320 is turned on, the liquid crystal molecules 323a are arranged to be substantially perpendicular to the first and second substrates 321 and 322.

In this case, as described above, because the sub-liquid crystal layer 223 has the homogenous arrangement, the sub-liquid crystal layer 323 may satisfy an equation $\Delta n \times d = \lambda/2$.

Thus, as shown, if the auxiliary display panel 320 is in an OFF state, the linearly polarized left or right image made incident to the auxiliary display panel 320 passes through the first substrate 321 of the auxiliary display panel 320 so as to be changed in its state to a left circular polarization (or right circular polarization), which then passes through the sub-liquid crystal layer 323. At this time, a left circularly polarized (or right circularly polarized) left or right image made incident to the sub-liquid crystal layer 323 passes through the sub-liquid crystal layer 323 so as to be changed in its state to a right circular polarization (or left circular polarization), which is then outputted to outside of the auxiliary display panel 320.

If the auxiliary display panel 320 is in an ON state, the left circularly polarized (or right circularly polarized) left or right image which has passed through the auxiliary display panel 320 is outputted to the outside of the auxiliary display panel 320, with its polarization state unchanged. This is because as the liquid crystal molecules 323A are arranged to be perpendicular to the first and second substrates 321 and 322, light passes through the sub-liquid crystal layer 323 only with the refractive index in the shorter axis direction, not the refractive index anisotropy ($\Delta n$). Therefore, the polarization state or polarization information is not changed.

A driving principle of the stereoscopic image display device according to the present invention will now be described in detail with reference to FIG. 12.

FIG. 12 is an exemplary view for explaining a driving principle of the stereoscopic image display device according to the present invention.

In order to drive the main display panel according to the present invention, as described above, the TFTs connected to the gate lines are switched twice as fast and data signals are applied to the data lines also twice as fast. Here, as for the data signals, left eye data signals and right eye data signals are applied to the data lines in turns according to a switching speed of the TFTs.

In detail, as shown, the main display panel is driven to have 60 frames, and each frame includes a first subframe displaying the left image and a second subframe displaying the right image.

In this case, for example, the main display panel may be driven to display the left image on the first subframe during 0~8 seconds, and the main display panel may be driven to display the right image on the second subframe during 8~16 seconds. And, the main display panel may be driven to display the left image on the first subframe during 16~24 seconds, and the main display panel may be driven to display the right image during the second subframe during 24~32 seconds.

In this manner, the 60 frames are sequentially driven so that the main display panel can display the left and right images in turns to implement a stereoscopic image.

As mentioned above, each frame includes the first subframe for displaying the left image and the second subframe for displaying the right image.

The auxiliary display panel is provided to be turned on in synchronization with the left image of the main display panel, and is not driven, for example, while the main display panel is displaying the right image. However, the present invention is not limited thereto, and the auxiliary display panel according to the present invention may be turned on in synchronization with the right image and may not be driven while the main display panel is displaying the left image.

When the auxiliary display panel is turned on, it outputs polarization information of the left image outputted from the main display panel without changing it, and when the auxiliary display panel is turned off, it changes the polarization information of the right image outputted from the main display panel, and outputs the image.

In detail, light emitted from a light source is made incident to the auxiliary display panel after passing through the main display panel. Here, the first and second polarizers of the main display panel are perpendicular to each other. In this case, for light directed to the main display panel form the light source, only a portion of the light in the same polarization state as the polarization axis of the second polarizer can pass through the main display panel.

The auxiliary display panel is maintained in an OFF state during the first subframe (0~8 seconds) of the first frame, so the polarization state of the light that passes through the auxiliary display panel is changed. Namely, the auxiliary display panel rotates the polarization axis of the incident left image by 90° and outputs it. As a result, the polarization state of the outputted left image is the same as that of light that has passed through the first polarizer.

The first embodiment of the present invention in which the λ/4 retardation layer is not applied is shown as an example. However, the present invention is not limited thereto. That is, the present invention can also be applicable to the case where light is outputted with the λ/4 retardation layer applied and thus is polarized to a left circular polarization or a right circular polarization.

During the second subframe (8~16 seconds) of the first frame, the auxiliary display panel is turned on, so polarization state of light that has passed through the auxiliary display panel is not changed. Namely, the auxiliary display panel outputs the right image having the same polarization axis as that of the incident right image.

Accordingly, because the polarization axis of the left polarization lens of the polarization glasses is identical to that of the left image, the outputted left image is made incident to the left eye of the viewer, and because the polarization axis of the right image is perpendicular to the polarization axis of the left polarization lens, the outputted right image is not made incident to the viewer's left eye. Also, because the polarization axis of the right polarization lens of the polarization glasses is identical to that of the right image, the outputted right image is made incident to the right eye of the viewer, and because the polarization axis of the left image is perpendicular to the polarization axis of the right polarization lens, the outputted right image is not made incident to the viewer's right eye.

In this manner, the left and right images, each having a different polarization axis, are formed with a time difference, and a polarization state of one of the left and right images is changed and outputted to the viewer. Thus, the viewer can discriminately view the left and right images according to their polarization state by using the polarization glasses, and thus, the viewer can view a stereoscopic image.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A stereoscopic image display device comprising:
a main display panel operable to alternately display left and right images according to each subframe;
an auxiliary display panel that changes polarization information of one of the displayed left and right images without a polarizer, the auxiliary display panel including first and second substrates having a pixel part corresponding to that of the main display panel and a sub-liquid crystal layer formed between the first and second substrates, and positioned in front of the main display panel,
a plurality of first electrodes patterned on the first substrate along the rows of pixels formed on the main display panel;
a second single electrode on an entire surface of the pixel part of the second substrate;
wherein the changes of polarization information comprises:
turning on the first and second electrodes in the auxiliary display panel to align liquid crystal molecules in the sub-liquid crystal layer formed between the first and second substrate such that polarization axis of the left or right image that has passed through the auxiliary display panel is unchanged when one of the left and right images is displayed on the main display panel, and
turning off the first and second electrodes in the auxiliary display panel to align liquid crystal molecules in the sub-liquid crystal layer formed between the first and second substrate such that polarization axis of the left or right image is substantially perpendicular to that of the left or right image made incident on the auxiliary display panel when the other one of the left and right images is displayed on the main display panel; and
wherein a $\lambda/4$ retardation layer is formed on the first substrate of the auxiliary display panel which changes a linearly polarized left or right image made incident to the auxiliary display panel into a left circularly polarized or right circularly polarized state.

2. The device of claim 1, wherein the second electrode is on the entire surface of the pixel part of the second substrate without any patterns.

3. The device of claim 1, wherein the first and second electrodes are made of a transparent conductive material such as ITO.

4. The device of claim 1, wherein the height of the first electrode corresponds to the height of a single pixel of the main display panel, and the width of the first electrode corresponds to 'n' (n=1, 2, . . . ) times the width of the pixel part.

5. The device of claim 1, wherein the main display panel is driven to have 60 frames, and each frame includes a first subframe displaying the left image and a second subframe displaying the right image.

6. The device of claim 1, wherein the sub-liquid crystal layer includes a plurality of liquid crystal molecules, and when the auxiliary display panel is driven, the liquid crystal molecules are arranged to be perpendicular to the first and second substrates, and when the auxiliary display panel is not driven, the liquid crystal molecules are arranged in a twisted nematic structure.

7. The device of claim 1, wherein the sub-liquid crystal layer includes a plurality of liquid crystal molecules, and when the auxiliary display panel is driven, the liquid crystal molecules are arranged to be perpendicular to the first and second substrates, and when the auxiliary display panel is not driven, the liquid crystal molecules are arranged to be parallel to the first and second substrates.

8. The device of claim 1, wherein a polarization axis of the left or right image made incident to the auxiliary display panel and a rubbing direction of the auxiliary display panel are positioned at 45°.

9. The device of claim 4, wherein when the auxiliary display panel is not driven, a polarization axis of the left or right image that has passed through the auxiliary display panel is perpendicular to a polarization axis of the left or right image made incident to the auxiliary display panel.

10. The device of claim 1, wherein the main display panel is driven at 120 Hz or higher.

11. The device of claim 1, wherein the main display panel comprises:
an array substrate;
a color filter substrate disposed to face the array substrate;
a main liquid crystal layer positioned between the array substrate and the color filter substrate;
a first polarizer attached on an outer surface of the array substrate; and
a second polarizer attached on an outer surface of the color filter substrate.

12. The device of claim 1, wherein the $\lambda/4$ retardation layer in formed in an in-cell form on an upper surface of the first substrate of the auxiliary display panel together with the first substrate.

13. The device of claim 1, wherein the $\lambda/4$ retardation layer is attached in a form of a film on a lower surface of the first substrate of the auxiliary display panel.

14. The device of claim 5, wherein when the auxiliary display panel is turned on, it outputs polarization information of the left image outputted from the main display panel without changing it, and when the auxiliary display panel is turned off, it changes the polarization information of the right image outputted from the main display panel, and outputs the image.

* * * * *